L. R. DEXTER.
Sleigh.
No. 94,723. Patented Sept. 14, 1869.
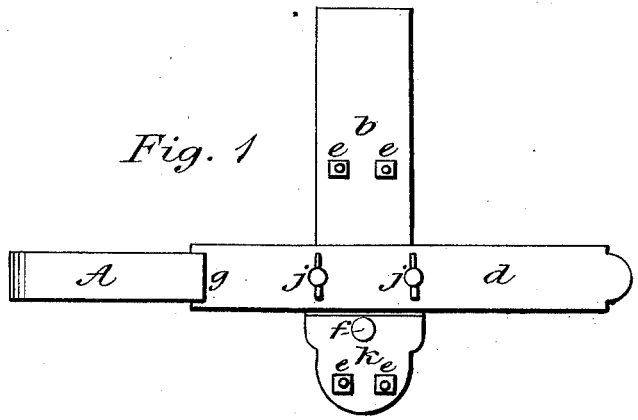
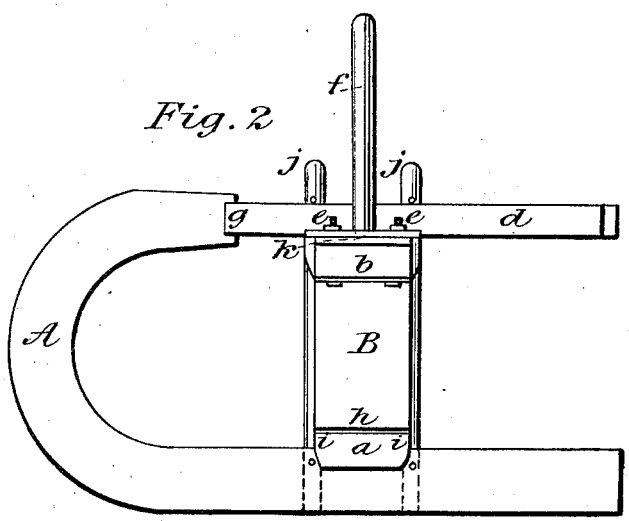
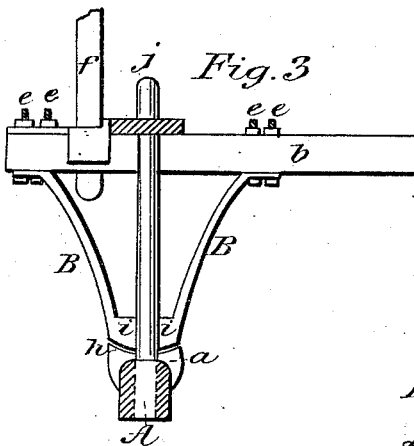
Witnesses:
Inventor:

United States Patent Office.

LYMAN R. DEXTER, OF LANCASTER, NEW HAMPSHIRE.

Letters Patent No. 94,723, dated September 14, 1869.

IMPROVED SLED-CLAMP.

The Schedule referred to in these Letters Patent and making part of the same.

*To all whom it may concern:*

Be it known that I, LYMAN R. DEXTER, of Lancaster, in the county of Coos, and State of New Hampshire, have invented a new and improved Sled-Clamp; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

The object of this invention is so to attach the frame or body of sleds to the runners as will not only secure the one to the other in a firm and substantial manner, but, at the same time, prevent the runner from "spreading" under heavy loads, and also guard against the possibility of splitting the runners at the points of attachment.

In the accompanying drawings—

Figure 1 is a plan or top view of my invention;

Figure 2, a side view; and

Figure 3, a rear end view.

Similar letters of reference indicate like parts in the several drawings.

A is a sled-runner, which may be of any desired size, and constructed in the ordinary manner.

B represents the braces or knees, the lower ends of which rest on and fit a recess, $h$, in the sole-plate $a$, and then spreads into two archiform braces or knees, until they come in contact with and are bolted to the beam $b$.

In close contact with the braces or knees B, and on either side of them, are two uprights, $j$ $j$, the lower ends of which are mortised into the runners, and the upper ends pass through and are secured with pins, or otherwise, to the sled-frame $d$. These uprights $j$ $j$ not only secure the frame and runner together, but, at the same time, keep the sole-plate $a$ and braces or knees B securely in position, by reason of recesses, $i$, formed in them, and into which the uprights $j$ $j$ are fitted.

On the upper side of the beam $b$, and between its outer end and the side of the frame $d$, is a cap or plate of iron, $k$, so constructed as to firmly enclose the sides of the beam $b$, thus preventing its splitting, while, at the same time, it keeps the frame $d$ in place, so that it cannot spread.

Through this cap pass the bolts $e$ $e$, which secure the knees or braces B firmly to the beam $b$; besides, it acts as a collar for the stake $f$, which passes through it and the beam $b$.

The end of the frame $d$ is recessed into the end of the runner, at the point $g$, thereby not only adding to the general strength of the frame and runner, but also correcting any tendency the frame or body of the sled might have to tilt or work upward.

From the foregoing description, it will be seen that by means of my clamp, I make a strong and compact union between the frame and runners of sleds, so that the one becomes an intimate part of the other, making it impossible to separate them, while, at the same time, admitting of the necessary repairs without trouble, and at little expense.

Having thus described my invention,

What I claim as new, and desire to secure by Letters Patent, is—

The clamping together of the runners and frames of sleds, by means of the braces B, uprights $j$ $j$, in combination with the sole-plate $a$, and cap or plate $k$, all as and for the purpose hereinbefore described.

LYMAN R. DEXTER.

Witnesses:
RICHARD P. KENT,
NELSON KENT.